Patented Apr. 30, 1935

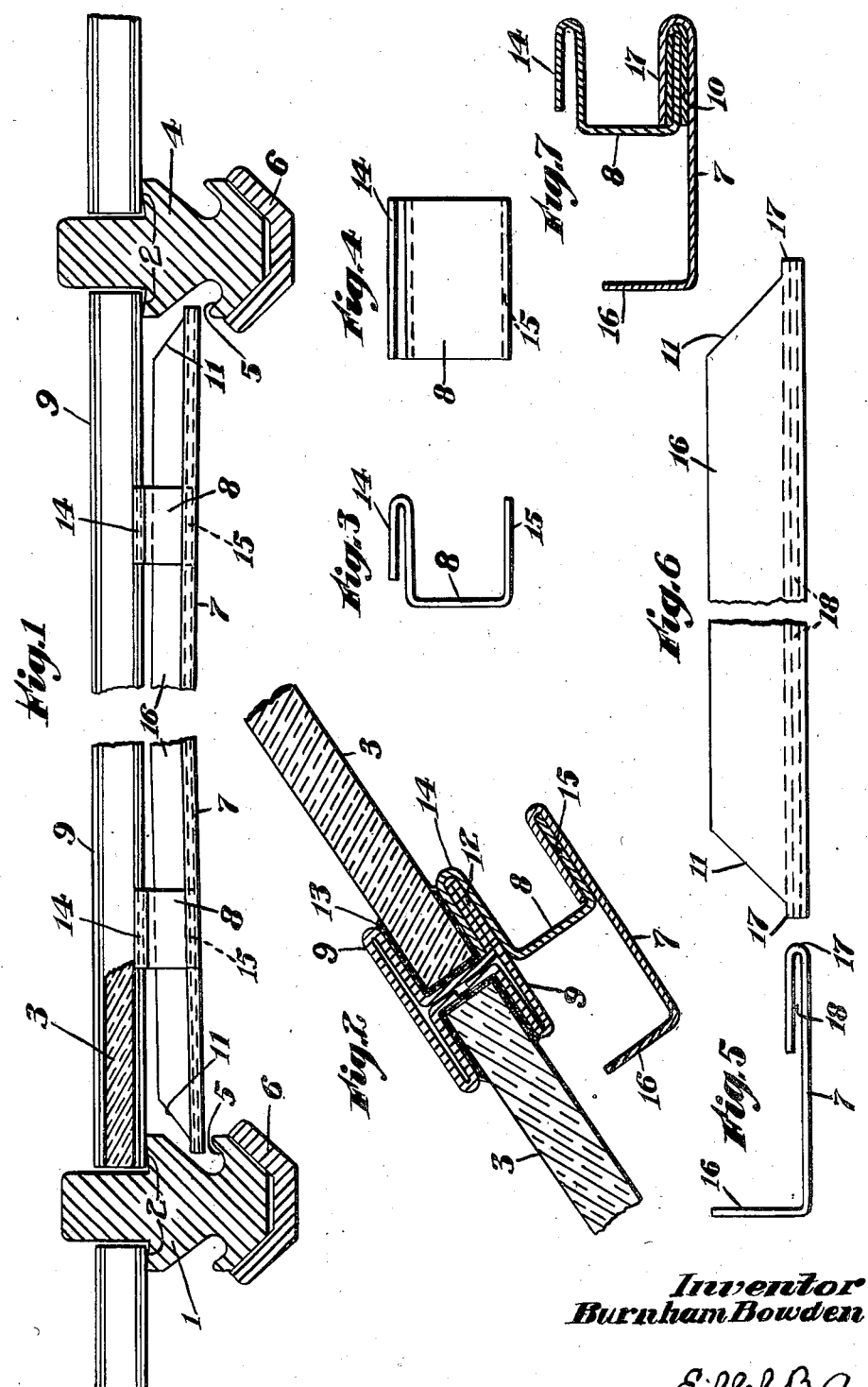

1,999,861

UNITED STATES PATENT OFFICE 1,999,861

DETACHABLE GUTTER FOR CAME

Burnham Bowden, Irvington-on-the-Hudson, N. Y., assignor to Lord & Burnham Company, Irvington-on-the-Hudson, N. Y., a corporation of New York Application January 17, 1934, Serial No. 706,996

11 Claims. (Cl. 108—16)

This invention relates to a new and improved drip gutter for greenhouses and the like and relates more particularly to a drip gutter adapted to be used in association with a glazing connection at the point where the ends of two panes of glass are in adjacent or abutting relation in order to collect the water of condensation which may drip from the came or other glazing joint between the ends of the glass, and convey such water to drip grooves in roof bars at either end of the drip gutter.

In glass structures such as those for greenhouse or horticultural purposes, a certain amount of dripping of water of condensation from the interior of the glass or other portion of the structure is tolerated and is not considered a particularly objectionable feature; on the other hand, in such glass enclosed structures as sun-parlors, solariums, glass skylights, and the like, the requirements are more stringent and greater care is required in eliminating, in so far as possible, any dripping from the glass, joint connections, or other parts of the structure. It is highly desirable and necessary to provide and maintain a water tight connection between the adjacent ends of panes of glass, and to eliminate the dripping of water of condensation, particularly in sun-parlors and solariums in order to avoid damage to the furniture and hangings. The difficulty of disposing of water of condensation at joints would not be encountered if a continuous glass surface could be used, but in practical construction for structures of the above type it is difficult to handle glass over six feet long so that for this reason it is necessary to employ a number of panes of glass, the ends of which must be connected or joined in suitable manner to form a water-tight joint, and means must be provided for taking care of any water of condensation which may be accumulated at such joints.

Heretofore, efforts have been made to employ drip gutters adjacent the came or abutting joint connections in order to dispose of the water of condensation which accumulates at such points, but such construction has not been satisfactory. One of the difficulties of, and objections to such prior structures has been that special and expensive fittings would have been required in the structures in which in some instances an extruded metal form has been used. In other instances, the arrangement between the came or glazing connection between the glass ends and the drip gutter has been such that there has been a great interchange of heat between the came or glazing joint and the drip gutter. This latter feature is particularly objectionable in cold weather as it is conductive to condensation at the came and on the drip gutter itself due to the contact of any warmer moisture laden air within the sun parlor or solarium and the relatively lower temperature of the drip gutter.

The accumulation of water of condensation presented a particularly difficult problem where the glass enclosure was for a swimming pool in which the atmosphere is substantially saturated with moisture at relatively high temperature approximating possibly 80° F.

Another problem and difficulty presented by certain prior art structures was that of finishing the ends of the drip gutter to the proper form and length and shaping the same with accuracy in order to relate the ends of the gutter to the drip groove in the roof bar within the very limited space between the under side of the glass and the top of the drip groove which makes it practically impossible to arrange and maintain an independently supported drip gutter so as to carry water into the drip groove.

One of the objects of the present invention is to provide a drip gutter construction adapted to be used to collect the water of condensation from a point at which adjacent ends of the panes of glass are seated or joined by a simple and inexpensive structure which will overcome the objections above referred to of certain prior art.

A further object is to provide a drip gutter of the class referred to which is detachably supported in position so that it may be readily positioned during the initial assembly in erecting the structure, and so that the gutter may, as desired, be removed for purposes of cleaning, without interfering with the joint connection between the adjacent glass ends.

A further object is to provide a drip gutter structure which may be readily insulated from the came joint structure in order to prevent interchange of heat between the gutter within the structure, and the came joint construction exposed to the temperatures outside of the structure.

A further object is to provide a combination drip gutter and clip connector which may be readily formed of sheet metal.

One preferred form of the invention is shown for purposes of illustration in the accompanying drawing:

Fig. 1 is a sectional view showing the arrangement of the drip gutter relative to the glass panes, and the manner in which the water of condensation is conveyed to the drip grooves in two roof bars shown in section.

Fig. 2 is an enlarged section through the came joint connection at the adjacent glass ends, and also showing the drip gutter and clip connector therefore in section.

Fig. 3 is a section of the connecting clip.

Fig. 4 is a side elevation of Fig. 3.

Fig. 5 is a section of the gutter.

Fig. 6 is a side elevation of Fig. 5.

Fig. 7 is a modified form showing a section of the assembly of the clip and gutter showing the heat insulating material between the clip and the gutter.

As shown in Fig. 1, roof bars 1 composed preferably of wood, are provided with glazing shoulders 2 to support panes of glass 3 which extend between two of the roof bars 1 and 4. The roof bars are provided at their sides with drip grooves 5 adapted to convey the water of condensation.

As shown, the wooden roof bar is supported on a metal roof bar 6. It is understood, however, that other forms of roof bar than that shown may be employed so long as a drip groove is provided in the roof bar for carrying away the water of condensation there deposited. The drip gutter 7, hereinafter more fully described, is detachably supported by means of clips 8, below the came joint 9 between adjacent ends of the panes of glass. The came joint extends normal to the roof bars.

By providing separate clips 8 at spaced points for detachably supporting the drip gutter in position, substantially the entire length of the gutter 7 is maintained in spaced relation from the came. By such an arrangement, the only possible point for exchange of heat between the gutter and the came is through the clip connections 8.

In order to minimize the exchange of heat between the gutter and the came through the clip, heat insulating material such as webbing 10 or the like may be interposed between the gutter 7 and the clip 8 as shown in Fig. 7.

In order to bring the ends of the gutter in functioning relation with the drip groove 5 in the roof bar, the ends 11 of the drip gutter 7 are cut back or beveled as indicated in Figs. 1 and 6.

As shown in Fig. 2, the came joint for connecting the adjacent ends of the glass is preferably formed of a continuous strip of sheet metal which is bent into an H form.

Other forms of joints or came connectors may be employed so long as the came provides an underlying flange portion 12 for one of the panes of glass 3. The underlying flange serves as a supporting or connecting means for the clip connector 8.

The clip connector 8 may be formed of sheet metal which is bent to a general U-shaped form, one of the arms 14 being longer than the other arm 15 and bent outwardly and backwardly upon itself to form a U-shaped portion adapted to slide over the underlying flange 12 of the came. Putty 13 may be interposed between the ends of the glass and the came in the usual manner. The outer and backwardly turned portion 14 of the clip may be inserted between the glass and the underlying flange 12, in the space which would normally be filled with putty, although a certain amount of putty would still be used at that point to obtain a water-tight joint.

The drip gutter 7 is preferably also formed of sheet metal having one end 16 upstanding and bent substantially normal to the main body. The other side 17 of the drip gutter is bent backwardly upon itself so as to form a slot 18 adapted to receive the arm 15 of the clip. If heat insulating material is used the slot 18 is made of sufficient width to receive webbing or other insulating material that may be interposed at that point.

It is apparent from the above description that the drip gutter may be readily positioned and properly assembled in its relation relative to the came by bringing the gutter to its proper relative position and sliding downwardly so that the arm 15 engages the slot 18 of the drip gutter.

By reference to Fig. 2, it is clear that any water of condensation which accumulates upon the came 9, would drop and be deposited in the gutter 7 by which it would be conveyed to the drip grooves 5 in the roof bars.

As shown in Fig. 1, the drip gutter is arched slightly from its center so that the ends are lower than the center portion in order to drain the water of condensation to the drip grooves in the bars adjacent the ends.

While one preferred form has been shown for purposes of illustration, it is understood that various changes and modifications may be made without departing from the spirit and scope of this invention as defined in the appended claims.

What I therefore claim and desire to secure by Letters Patent is:

1. In the combination of roof bars having drip grooves and a seat for glass associated therewith, and a plurality of panes of glass having their ends substantially abutting in the same plane, a came connection between the adjacent ends of the glass and a drip gutter supported below the came detachably supported in spaced relation to the came and adapted to receive the water of condensation from the glass, a means connected at one end to the came and at the other end to the drip gutter, the drip gutter being arranged to convey the water of condensation to the drip grooves in the roof bar.

2. The combination set forth in claim 1 and heat insulating material interposed between the drip gutter and the end of the member supporting the drip gutter from the came.

3. In the combination of a plurality of panes of glass having their ends in substantially abutting relation, a came connection therebetween adapted to receive the ends of the panes of glass, means supported in spaced relation below the came member for receiving the water of condensation from the glass and came, said means including a drip gutter and means for detachably connecting the drip gutter to the came at a plurality of points spaced in relation thereto whereby substantially the entire length of the drip gutter is maintained in spaced relation from the came in order to minimize the transfer of heat between the drip gutter and the came.

4. In the combination of claim 3 in which heat insulating material is interposed between the drip gutter and the connection to the came.

5. In the combination of a plurality of panes of glass having their ends terminating adjacent each other, a came connection between the ends of the glass, said came having a flange underlying one of the panes of glass, a drip gutter supported in spaced relation below the came throughout the entire length of the drip gutter, and a clip detachably connecting the drip gutter to the underlying flange of the came.

6. A combination set forth in claim 5 in which one end of the clip is detachably secured to the drip gutter whereby the drip gutter may be removed without disturbing the came connector between the ends of the panes of glass.

7. The combination as specified in claim 5 in which the clip and drip gutter may be detachably connected to the came member without disturbing the came connection between the adjacent ends of the glass.

8. A glazing joint comprising a came formed of a single strip of sheet metal arranged in an H form and adapted to receive the two adjacent ends of panes of glass, a drip gutter supported throughout substantially its entire length in spaced relation to the came, and a clip detachably connecting the drip gutter and the came.

9. A glazing joint specified in claim 8 in which the clip connection includes a bent end portion adapted to slide over an underlying flange of the came.

10. A glazing joint specified in claim 8 in which the drip gutter includes a bent end portion adapted to slide over a bent portion of the clip, the gutter portion of the drip gutter being disposed below the came member so as to receive any water of condensation received by the came member.

11. A drip gutter comprising a strip of sheet metal having an upturned flange at one side substantially normal to the body portion, and a substantially U-shaped flange at the other side of the gutter adapted to serve as a detachable connecting portion for a clip, and a U-shaped clip formed of sheet metal, one arm of the U-shaped portion being adapted to slide within the bent U-shaped portion of the gutter, the other arm of the clip portion being bent outwardly and downwardly to form a restricted U-shaped portion for detachable connection to a portion of a came joint connector.

BURNHAM BOWDEN.